April 1, 1958     W. C. LEVINGS     2,829,245
LAMP SHADE MADE OF RETAINER FRAMES
Filed May 11, 1955     2 Sheets-Sheet 1

INVENTOR.
Wendell Christie Levings
BY Harold E. Cole
Attorney

April 1, 1958     W. C. LEVINGS     2,829,245
LAMP SHADE MADE OF RETAINER FRAMES
Filed May 11, 1955     2 Sheets-Sheet 2
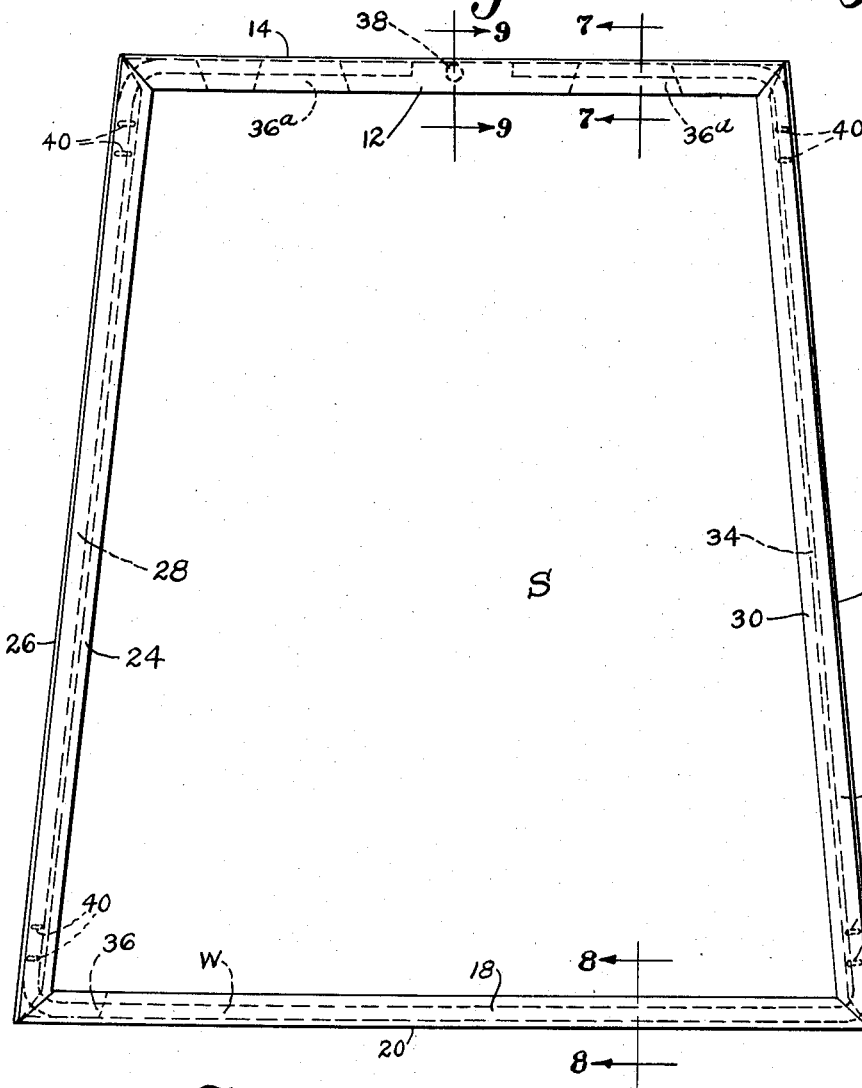
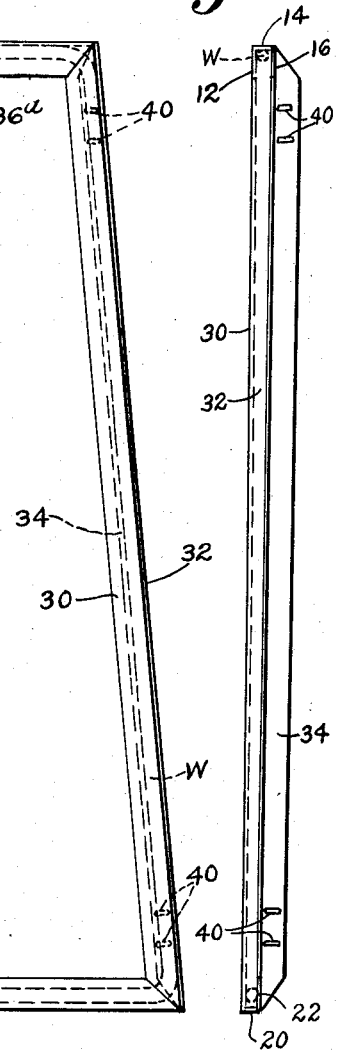
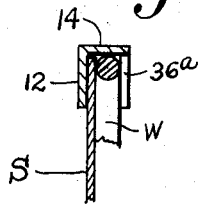
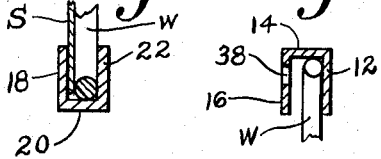
INVENTOR.
Wendell Christie Levings
BY Harold E. Cole
Attorney

United States Patent Office 2,829,245
Patented Apr. 1, 1958

2,829,245

LAMP SHADE MADE OF RETAINER FRAMES

Wendell Christie Levings, Rockland, Mass.

Application May 11, 1955, Serial No. 507,556

3 Claims. (Cl. 240—108)

This invention relates to a lamp shade made of retainer frames connected together, to hold display members.

One object of my invention is to provide display frames that an unskilled person, without the use of tools, can assemble to form a lamp shade, and likewise to disassemble, thus enabling the storing and shipping of the parts forming the shade as unassembled parts in a compact package consisting of flat parts.

Another object is to provide such retainer frames in which, when assembled to form a lamp shade, display sheets can be mounted or removed therefrom.

A further object is to provide retainer frames which can be assembled to form a complete lamp shade or the like, without a master or overall frame to attach said frames to.

A still further object is to provide retainer frames that can be assembled to provide various shapes of lighting shades.

The foregoing and other objects, which will appear as the nature of the invention is better understood, may be accomplished by a construction, combination and arrangement of parts such as is disclosed by the drawing. The nature of the invention is such as to render it susceptible to various changes and modifications, and, therefore, I am not to be limited to the construction disclosed by the drawing nor to the particular parts described in the specification; but am entitled to all such changes therefrom as fall within the scope of my claims.

In the drawings:

Fig. 5 is a front elevational view of the frames used to form a lamp shade holding a photograph.

Fig. 6 is a side elevational view of said frame.

Fig. 7 is an enlarged, sectional view taken on the line 7—7 of Fig. 5.

Fig. 8 is an enlarged, sectional view taken on the line 8—8 of Fig. 5.

Fig. 9 is an enlarged, sectional view taken on the line 9—9 of Fig. 5.

Figure 1:
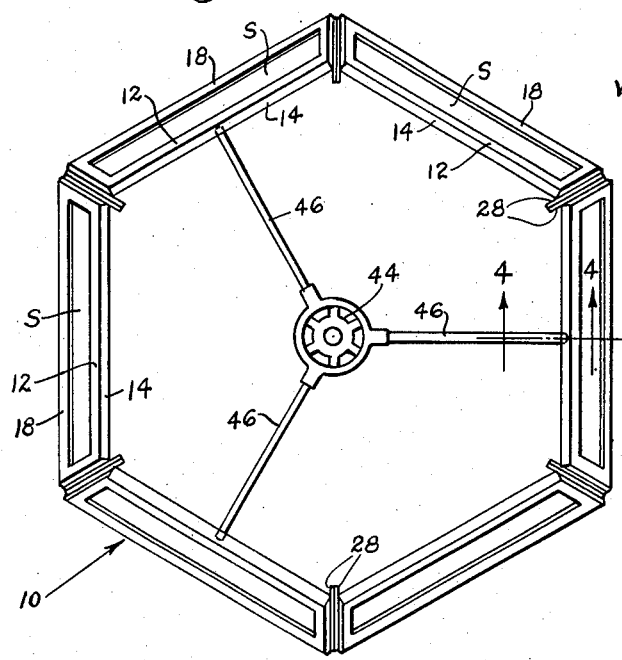
Fig. 1 is a top plan view of an assembled lamp shade with display sheets therein.
Figure 3:
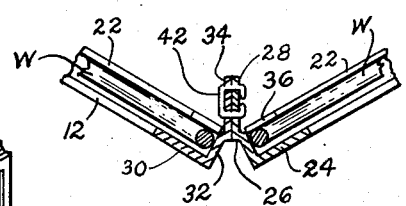
Fig. 3 is an enlarged, sectional view taken on the line 3—3 of Fig. 2.
Figure 4:
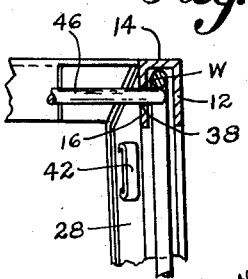
Fig. 4 is an enlarged, sectional view taken on the line 4—4 of Fig. 1.
Figure 2:
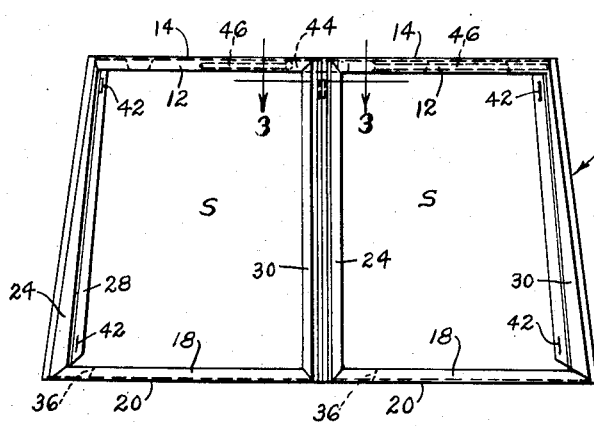
Fig. 2 is a side elevational view thereof.
Figure 10:
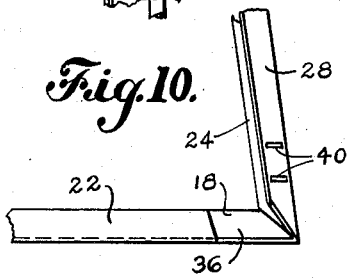
Fig. 10 is a fragmentary, elevational view showing the lower right corner of a said frame, taken from the rear.

As illustrated, a retainer frame 10 is provided, shown in the form of a trapezoid in Fig. 5, being wider at the bottom than at the top, in position of use, since a lamp shade, to be formed of said frames, preferably flares outwardly from top to bottom. The upper part of said frame 10 is channel-shaped, having a front portion 12, an intermediate portion 14 and a rear portion 16 parallel with said front portion 12. Likewise the bottom part is channel-shaped, having a front portion 18, an intermediate portion 20 and a rear portion 22 parallel with said front portion 18. The left side of said frame 10 has a front portion 24, an intermediate portion 26 extending rearwardly at a right angle to said front portion, and a rear attaching portion 28 extending diagonally inward from and being of greater width than, said intermediate portion 26. The right side of said frame 10 has a front portion 30, an intermediate portion 32 extending rearwardly at a right angle to said front portion, and a rear attaching portion 34 extending diagonally inward from, and being of greater width than said intermediate portion 32. Said four intermediate portions 14, 20, 26 and 32 provide a continuous boundary portion within my retainer frame 10 for a spring retaining wire W, later described.

Said upper part rear portion 16 and said bottom part rear portion 22 each have a cut-out or opening 36 at one side for a purpose, later described. Also said upper rear portion 16 has a hole 38 therethrough in some instances, for a purpose later described. Said left side attaching portion 28 and said right side attaching portion 34 have openings 40 therethrough to receive two-pronged, joining clips 42 that attach one said retainer frame 10 to another, when said attaching portions 28 and 34 adjoin each other in the assembly.

To assemble said retainer frames 10 into a hexagonally shaped lamp shade, a said rear attaching portion 28 of the frame left side is placed next to a said rear attaching portion 34 of the right side of another said frame, and the two connected together by inserting the two prongs of said joining clips 42 through the holes 40 in said attaching portions and then bending said prongs over. When five of said retainer frames 10 are thus joined together, a sixth frame is joined at one side only and a spacer member is connected to the assembly, having a center or intermediate ring 44 and three arms 46 extending laterally outward therefrom. Each arm 46 extends through a said hole 38 in said upper part rear portion, and since only one arm 46 is used for every other retainer frame assembled, only every other retainer frame has a said hole 38, such a frame being shown in Fig. 5. To complete the assembly the remaining attaching portions 28 and 34 of the sixth frame are joined in the above explained way.

The frames are ready to receive the display sheets S, which may be a photograph, a picture on a paper or card, or other form of display. These are inserted into the upper and lower said cut-outs or openings 36 at one side of the frame and slid along until they reach the opposite side, thus filling the main opening in the frame. Then a spring wire W, having two free ends, is inserted under said rear portions and it bears against the four intermediate portions 14, 20, 26 and 32, providing said continuous boundary, when in position of use, thus firmly holding the display sheet S in place. Thus a self-supporting lamp shade, that holds display members, is provided by means of said retainer frames without the use of a master frame.

To remove a said wire W, the person's finger is inserted over the wire at one side of said frame and the wire is drawn towards the other side, which causes the free end portion to come out of the channel formed in the upper part of the frame. Then the other free end portion is moved out of the channel, and the wire is then removed and also said sheet.

To permit easy removal of said wire W from these retainer frames which receive an arm 46, I provide in a said upper part rear portion 16 two cut-outs or openings 36a at intermediate points at opposite sides of said hole 38, as shown in said Fig. 5. These cut-outs 36a make it possible to easily remove said wire W by inserting the fingers in said cut-outs 36a and forcing the two ends of the wire downwardly and out of the channel, thus moving clear of said arm 46.

Figure 11:
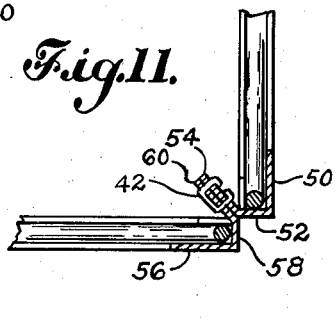
Fig. 11 is a sectional view similar to Fig. 3; but showing a modified form of attaching portion.

In the event that a rectangularly-shaped lamp shade is desired, each frame would be rectangularly-shaped, of the same width throughout. As shown in Fig. 11, the left side thereof has a front portion 50, an intermediate portion 52 extending rearwardly at a right angle to the front portion, and an attaching portion 54 extending rearwardly at an angle of approximately 45 degrees to said intermediate portion 52. The right side thereof has a front portion 56, a similar intermediate portion 58 at a right angle to the front portion, and a similar attaching portion 60 extending at an angle of approximately 45 degrees to said intermediate portion 58. These two attaching portions 54 and 60 adjoin each other when assembled and are joined by said clips 42 as explained.

What I claim is:

1. A lamp shade comprising a plurality of sheet retainer frames, each said frame embodying a channel portion at the upper part and lower part to receive a sheet, and two sides connecting said upper and lower channel portions, each said side having a front portion, an intermediate angular portion extending rearwardly from said front portion and a rear attaching portion extending diagonally inward from said intermediate portion, the two said attaching portions of each said frame being joined to attaching portions of two other said frames, means holding said attaching portions in joined position, and a spacer member embodying an intermediate member and a plurality of arms extending therefrom and connecting with some of said upper part channel portions of said retainer frames.

2. A lamp shade comprising a plurality of sheet retainer frames, each said frame embodying channel portion at the upper part and lower part to receive a sheet, a plurality of said frames having a hole in said channel portion, and two sides connecting said upper and lower channel portions, each said side having a front portion, an intermediate angular portion extending rearwardly from said front portion and a rear attaching portion extending diagonally inward from said intermediate portion, the two said attaching portions of each said frame being joined to attaching portions of two other said frames, means holding said attaching portions in joined position, and a spacer member embodying an intermediate member and a plurality of arms extending therefrom and into said channel portion holes.

3. A lamp shade comprising a plurality of sheet retainer frames, each said frame embodying a channel portion at the upper part and lower part to receive a sheet, each said frame upper part and lower part having an opening in the rear portion of said channel portion at one side thereof and at least two of said frames having two openings in said rear portions intermediate opposite sides thereof, and a hole therethrough intermediate said latter two openings and two sides connecting said upper and lower channel portions, each said having a front portion, an intermediate angular portion extending rearwardly from said front portion and a rear attaching portion extending diagonally inward from said intermediate portion, the two said attaching portions of each said frame being joined to attaching portions of two other said frames, means holding said attaching portions in joined position, and a spacer member embodying an intermediate member and a plurality of arms extending therefrom and into said channel portion holes.

References Cited in the file of this patent

UNITED STATES PATENTS

| 1,335,640 | Beales | Mar. 30, 1920 |
| 1,575,720 | Scott | Mar. 9, 1926 |
| 1,903,463 | Koch | Apr. 11, 1933 |
| 2,061,510 | Drumpelmann | Nov. 17, 1936 |

FOREIGN PATENTS

| 463,280 | France | Dec. 12, 1913 |
| 509,222 | Great Britain | July 12, 1939 |
| 480,079 | Italy | Apr. 18, 1953 |

U. S. DEPARTMENT OF COMMERCE
PATENT OFFICE

CERTIFICATE OF CORRECTION

Patent No. 2,829,245

April 1, 1958

Wendell Christie Levings

It is hereby certified that error appears in the printed specification of the above numbered patent requiring correction and that the said Letters Patent should read as corrected below.

Column 4, line 20, after "each said" insert --side--.

Signed and sealed this 20th day of May 1958.

(SEAL)
Attest:

KARL H. AXLINE
Attesting Officer

ROBERT C. WATSON
Commissioner of Patents